(12) United States Patent
Kennedy, Sr.

(10) Patent No.: US 7,156,469 B2
(45) Date of Patent: Jan. 2, 2007

(54) THREE POINT SEAT BELT SYSTEM

(76) Inventor: Johnny R. Kennedy, Sr., 5136 JRK Dr., Durham, NC (US) 27705-8370

( * ) Notice: Subject to any disclaimer, the term of this patent is extended or adjusted under 35 U.S.C. 154(b) by 0 days.

(21) Appl. No.: 11/208,878

(22) Filed: Aug. 22, 2005

(65) Prior Publication Data

US 2005/0275211 A1    Dec. 15, 2005

Related U.S. Application Data

(63) Continuation of application No. 10/705,583, filed on Nov. 10, 2003.

(51) Int. Cl.
 *B60R 22/00*    (2006.01)
(52) U.S. Cl. .................................... 297/483
(58) Field of Classification Search ............... 297/483, 297/475, 468, 467
See application file for complete search history.

(56) References Cited

U.S. PATENT DOCUMENTS

| | | | | |
|---|---|---|---|---|
| 2,071,903 A | 2/1937 | Shively | ............... | 280/150 |
| 2,257,099 A | 9/1941 | Beirise | ............... | 242/107 |
| 2,468,560 A | 4/1949 | Kirkpatrick | ............... | 155/189 |
| 2,480,335 A | 4/1949 | Nordmark | ............... | 155/189 |
| 2,488,858 A | 11/1949 | Franz | ............... | 155/189 |
| 2,649,145 A | 8/1953 | McCarthy | ............... | 155/189 |
| 2,701,693 A | 2/1955 | Nordmark et al. | ............... | 242/107 |
| 2,725,097 A | 11/1955 | Thoreson | ............... | 155/189 |
| 2,798,539 A | 7/1957 | Johnson | ............... | 155/189 |
| 2,814,504 A | 11/1957 | Campbell et al. | ............... | 280/150 |
| 2,819,095 A | 1/1958 | Haltmar, Jr. | ............... | 280/150 |
| 2,830,655 A | 4/1958 | Lalande | ............... | 155/189 |
| 2,937,882 A | 5/1960 | Oppenheim | ............... | 280/150 |
| 2,939,519 A | 6/1960 | McCall | ............... | 155/189 |
| 2,963,080 A | 12/1960 | Zang | ............... | 155/189 |
| 3,032,374 A | 5/1962 | Robinson, et al. | ............... | 297/388 |
| 3,065,027 A | 11/1962 | Misslich et al. | ............... | 297/388 |
| 3,147,995 A | 9/1964 | Bohlin | ............... | 297/385 |
| 3,147,996 A | 9/1964 | Ferrara et al. | ............... | 297/388 |
| 3,184,267 A | 5/1965 | Rumble | ............... | 297/388 |
| 3,199,918 A | 8/1965 | Nakolan | ............... | 297/388 |
| 3,248,148 A | 4/1966 | Board et al. | ............... | 297/388 |
| 3,304,119 A | 2/1967 | Boedigheimer | ............... | 297/388 |
| 3,323,829 A | 6/1967 | Liem | ............... | 296/65 |
| 3,351,381 A | 11/1967 | Boblitz | ............... | 297/385 |
| 3,385,633 A | 5/1968 | Aizley | ............... | 297/389 |
| 3,418,007 A | 12/1968 | Jantzen | ............... | 280/807 |
| 3,439,933 A | 4/1969 | Jantzen | ............... | 280/150 |
| 3,447,833 A | 6/1969 | Rice | ............... | 297/386 |
| 3,451,720 A | 6/1969 | Makinen | ............... | 297/483 |

(Continued)

*Primary Examiner*—Milton Nelson, Jr.
(74) *Attorney, Agent, or Firm*—Olive & Olive, P.A.

(57) ABSTRACT

A three-point seat belt system adapted for use with a seat frame having a seat back and a seat bottom, wherein the system comprises: (a) retractor shoulder belt with a single first connector on its distal end, adapted to be fixedly attached at its opposite end to the underside of said seat bottom, and extending to the front side of said seat back; (b) multi-connecting lap and shoulder belt comprising: (i) seat belt webbing connected to a Y-junction; (ii) a second connector consisting of a post connector attached to one end of the Y-junction, which releasably attaches to said first connector; and (iii) a third connector consisting of a tongue connector attached to the second end of the Y-junction; and (c) a single lap belt with a fourth connector consisting of a buckle on its distal end, which releasably attaches to said third connector.

1 Claim, 3 Drawing Sheets

U.S. PATENT DOCUMENTS

| | | | |
|---|---|---|---|
| 3,456,981 A * | 7/1969 | Booth et al. | 297/472 |
| 3,486,792 A | 12/1969 | Stoffel | 297/388 |
| 3,512,830 A | 5/1970 | Norman et al. | 297/250 |
| 3,600,768 A * | 8/1971 | Romanzi et al. | 24/579.11 |
| 3,620,569 A | 11/1971 | Mathis | 297/388 |
| 3,637,258 A | 1/1972 | Bayon | 297/389 |
| 3,645,549 A | 2/1972 | Jantzen | 297/388 |
| 3,695,696 A * | 10/1972 | Lohr et al. | 297/452.14 |
| 3,746,393 A | 7/1973 | Andres et al. | 297/385 |
| 3,806,195 A | 4/1974 | Frey | 297/385 |
| 3,915,495 A | 10/1975 | Oehm | 297/388 |
| 3,981,519 A | 9/1976 | Cataldo | 280/744 |
| 3,994,513 A | 11/1976 | Courtis et al. | 280/747 |
| 4,006,934 A | 2/1977 | Murakami et al. | 297/386 |
| 4,099,778 A | 7/1978 | Lehr | 297/386 |
| 4,109,962 A | 8/1978 | Magyar | 297/385 |
| 4,114,947 A | 9/1978 | Nelson | 297/344 |
| 4,205,670 A | 6/1980 | Owens | 128/134 |
| 4,238,135 A | 12/1980 | Sandham | 297/468 |
| 4,305,618 A | 12/1981 | Molnar | 297/476 |
| 4,314,715 A | 2/1982 | Duguet et al. | 280/801 |
| 4,585,273 A | 4/1986 | Higgs et al. | 297/452 |
| 4,632,425 A | 12/1986 | Barratt | 280/801 |
| 4,770,459 A | 9/1988 | Nakaiwa et al. | 296/65 R |
| 4,911,377 A | 3/1990 | Lortz et al. | 242/107.4 |
| 4,973,083 A | 11/1990 | Richards et al. | 280/801 |
| 5,031,961 A | 7/1991 | Isern | 297/473 |
| 5,147,110 A | 9/1992 | Syers | 297/397 |
| 5,246,271 A | 9/1993 | Boisset | 297/362.13 |
| 5,265,909 A | 11/1993 | Verbeski | 280/808 |
| 5,280,995 A | 1/1994 | Elton | 297/238 |
| 5,308,148 A | 5/1994 | Peterson et al. | 297/468 |
| 5,382,083 A | 1/1995 | Fecteau et al. | 297/452.2 |
| 5,429,418 A | 7/1995 | Lipper et al. | 297/465 |
| 5,439,271 A | 8/1995 | Ryan | 297/452.56 |
| 5,555,458 A | 9/1996 | Large | 340/945 |
| 5,570,933 A * | 11/1996 | Rouhana et al. | 297/483 |
| 5,575,533 A | 11/1996 | Glance | 297/452.2 |
| 5,624,135 A | 4/1997 | Symonds | 280/801.1 |
| 5,697,670 A | 12/1997 | Husted et al. | 297/216.13 |
| 5,746,476 A | 5/1998 | Novak et al. | 297/216.13 |
| 5,782,537 A | 7/1998 | Leistra et al. | 297/473 |
| 5,853,193 A | 12/1998 | Marshall | 280/748 |
| 5,890,909 A | 4/1999 | Gladish | 434/305 |
| 6,048,034 A | 4/2000 | Aumont et al. | 297/478 |
| 6,053,580 A | 4/2000 | White, Sr. | 297/467 |
| 6,116,696 A | 9/2000 | Widman et al. | 297/483 |
| 6,123,388 A | 9/2000 | Vits et al. | 297/216.13 |
| 6,139,111 A | 10/2000 | Pywell et al. | 297/484 |
| 6,217,069 B1 | 4/2001 | Ganesan | 280/801.1 |
| 6,264,280 B1 | 7/2001 | Ohlund | 297/474 |
| 6,312,056 B1 | 11/2001 | Murphy et al. | 297/464 |
| 6,328,379 B1 | 12/2001 | Merrick et al. | 297/216.1 |
| 6,412,863 B1 | 7/2002 | Merrick et al. | 297/216.18 |
| 6,485,098 B1 | 11/2002 | Vits et al. | 297/216.13 |
| 6,508,515 B1 | 1/2003 | Vits et al. | 297/483 |
| 6,565,120 B1 | 5/2003 | Ganesan | 280/801.1 |
| 6,676,219 B1 | 1/2004 | Brewer | 297/485 |
| 2001/0006303 A1* | 7/2001 | Girardin | 297/475 |
| 2001/0008337 A1 | 7/2001 | Ganesan | 280/801.1 |
| 2003/0025380 A1 | 2/2003 | Vits et al. | 297/483 |
| 2003/0034686 A1 | 2/2003 | Soderstrom et al. | 297/484 |
| 2003/0173817 A1 | 9/2003 | Vits et al. | 297/484 |

* cited by examiner

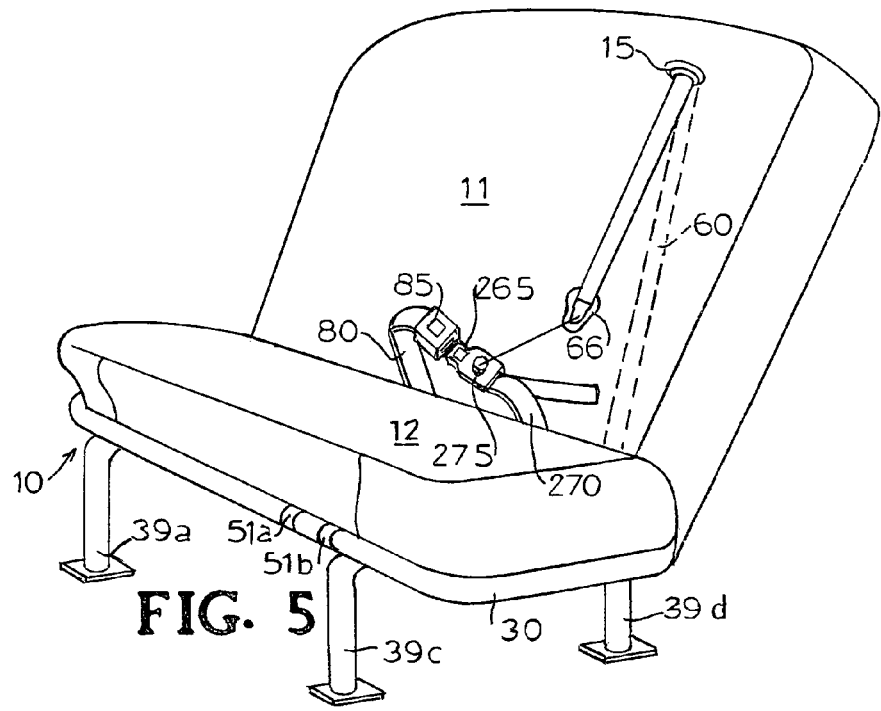
FIG. 5
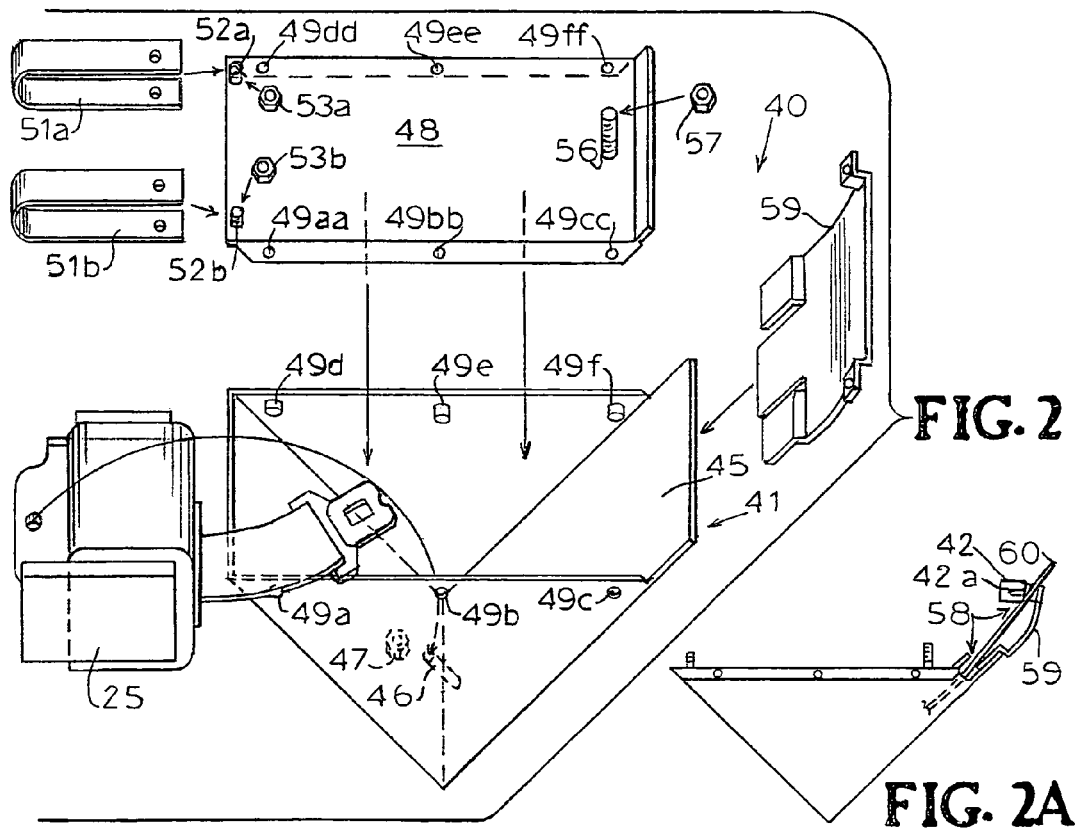
FIG. 2
FIG. 2A

THREE POINT SEAT BELT SYSTEM

This is a continuation of application Ser. No. 10/705,583 filed on Nov. 10, 2003.

SUMMARY OF THE INVENTION

Three-point seat belts may be retrofitted to a seat belt ready seat frame. In the specification that follows the following terminology will be utilized. The term "seat belt ready" means a seat frame, which without any substantial modification is adapted to be used with a seat belt assembly. The term "connector" as referred to at various times is intended to include commonly used connector components such as a tongue, a buckle, a clasp, or a post-type configuration. The term "Y-junction" will refer to the location at which the webbing connects to a junction, which splits off into two separate directions in the approximate direction of a Y. The term "retractor belt" will refer to the webbing and single connector which extends and retracts from a retractor over the shoulder and chest of an occupant. The term "single lap belt" will refer to the webbing and single connector, which extends across from one side of the lap of an occupant. The term "multi-connecting lap and shoulder belt" will refer to the webbing, Y-junction, and two connectors (or the embodiment wherein a tongue with a male post connector is incorporated therein in lieu of the Y-junction and two connectors) is located on an opposite side of the occupant, extending across the lap of the occupant and connected to both the retractor belt and to the single lap belt. The term "lap belt assembly" refers to the webbing and connectors at the junction of the single lap and multi-connecting lap and shoulder belt. One example of these terms is illustrated by the construction shown in FIG. 3.

A first embodiment of the invention permits a school bus seat belt ready seat frame to be retrofitted with a three-point seat belt. A retractor assembly is mounted inside a housing unit, which is then mounted to the underside of the seat frame. Mounting the housing unit to the underside of the seat frame may include the use of bolts, straps, and/or other means including welding the housing unit to the underside of the seat frame. The retractor assembly mounted inside the housing unit contains a retractor mechanism, as well as the retractor belt, which has mounted on its distal end a seat belt connector, which in the first embodiment is a tongue connector. The retractor belt which serves as a shoulder and chest protective belt extends out of the housing unit and is routed up and over the back of the seat frame, over the shoulder of the occupant and at its distal end is connected to a lap belt assembly. The retractor belt with its mounted connector is preferably routed through or over the seat back cushion. Channels (which are not shown) may be created in the seat back cushion to facilitate such routing of the seat belt. A single lap belt attached to the seat frame contains a buckle connector at its end. A multi-connecting lap and shoulder belt configuration is utilized containing what is in effect a Y-junction with two connectors. The first of the two connectors is a buckle, which releasably attaches to the tongue connector on the retractor belt. The second connector is a tongue connector, which connects to the belt connector on the single lap belt. The described first as well as all other embodiments of the invention may readily be adapted for use in other vehicles, including vans, trucks and cars, with both regular and bench-type seating as well as being adaptable for use as original equipment on new school buses. Alternative embodiments also include the use of the lap belt assembly alone without the use of the retractor belt to accommodate infant or child seats. Also included would be variations where the retractor belt connects to child restraint connectors. Also recognized is that the three-way connection used in the first as well as other embodiments of the invention and which serves to join the lap and shoulder belts may also be used separately of the illustrated retrofit housing.

A second embodiment of the invention provides a retrofit design for a school bus seat belt ready seat frame with multiple seat belt assemblies per bench seat. A retractor assembly in this second embodiment is mounted to the underside of the seat frame beneath the seating area for each occupant and the retractor belt for each occupant is routed similar to the routing for the first embodiment. Such embodiment can be employed for school bus bench seats seating multiple occupants including seats of 26 inches, 32 inches, 39 inches, 45 inches, and 90 inches as well as other size bench seats. Different configurations than as illustrated in FIG. 4 may include variations for left and right seating.

A third embodiment of the invention includes a clasp connector on the retractor belt. The two connectors on the multi-connecting lap and shoulder belt in this third embodiment are a tongue connector with a male post connector. The clasp connector on the retractor belt connects to the male post connector of the multi-connecting lap and shoulder belt. The single lap belt contains a buckle, which releasably attaches to the tongue connector of the lap and shoulder belt.

A fourth embodiment of the invention includes a tongue connector on the retractor belt and the multi-connecting lap and shoulder belt contains two buckles. The first buckle releasably attaches to the tongue of the retractor belt. The second buckle releasably attaches to a tongue connector attached to the distal end of the single lap belt.

Many variations are contemplated in addition to those described above. While the invention has been illustrated and described in detail in the drawings and foregoing description, the same is considered as illustrative and not restrictive in character, it being understood that only the preferred embodiments have been shown and described and that all changes and modifications that come within the spirit of the invention are desired to be protected.

BRIEF DESCRIPTION OF THE DRAWINGS

FIG. 2 is an exploded perspective view of the retractor and belt housing unit with the seat belt retractor.

FIG. 2A is a reduced side view of a portion of the assembled retractor and belt housing unit showing the aperture through which the retractor belt is extended and retracted.

FIG. 5 is a pictorial view of the third embodiment illustrating use of a clasp and post-type connector.

DETAILED DESCRIPTION

Figure 1:
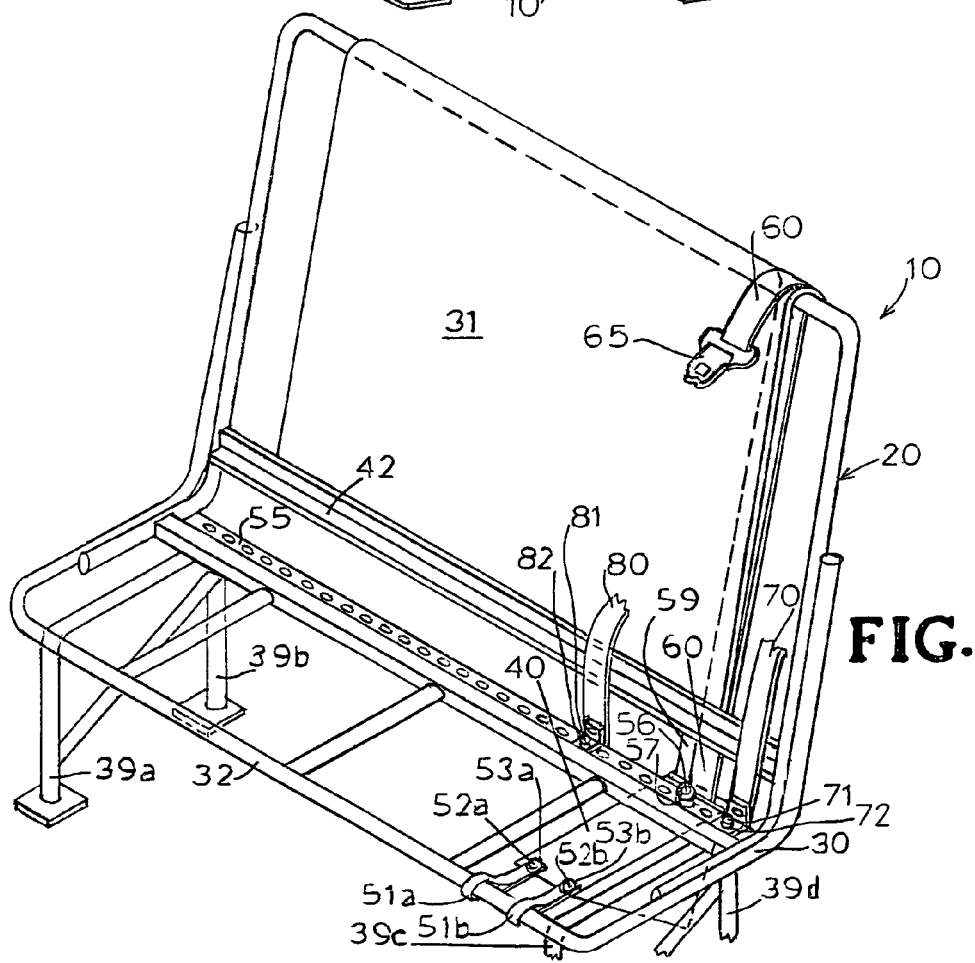
FIG. 1 is a perspective view of the first embodiment showing the seat belt ready seat frame, without the seat cushions, but showing the housing unit and belt attachments for a single occupant.

The first embodiment of the invention is shown in FIG. 1. Seat belt ready seat frame 10 is composed of back seat frame 20 and bottom seat frame 30. Metal sheet 31 is attached to back seat frame 20 and supports back cushion 11 shown in FIG. 3. The seat frame 10 is mounted onto the floor of a vehicle by mounting legs 39a, 39b, 39c and 39d. Alternative embodiments may include fewer legs as well as variations where the seat is mounted to the side of the vehicle. In this first embodiment, retractor and belt housing unit 40 is mounted to the underside of the seat frame 30 at the front bar portion 32 of bottom seat frame 30 by mounting straps 51a and 51b and by studs 52a and 52b and nuts 53a and 53b. The housing unit 40 is attached to the rear of the seat frame 10 at rear bar portion 55 by stud 56 and nut 57. In alternative embodiments of the invention, the housing unit may be attached solely to the rear of the seat frame by bolts and nuts or by other attachment means such as by welding the housing unit to the underside of bottom seat frame 30. Retractor belt 60 exits the aperture 58 (FIG. 2A) of the housing unit and back cover portion 59 and extends up and over the back of the back seat frame 20. Back cover portion 59 slideably attaches to enclosure portion 41 and secures to a wooden rail 42 located near the bottom of back seat frame 20, protecting the belt webbing from tampering by occupants in the immediately adjacent seats to the rear. Tongue connector 65 is connected at the distal end of webbing 60. Multi-connecting lap and shoulder belt 70 is attached to rear bar portion 55 by bolt 71 and nut 72. Single lap belt 80 is connected to rear bar portion 55 by bolt 81 and nut 82.

FIG. 2 is an exploded perspective view of retractor and belt housing unit 40. Housing unit 40 is composed of an enclosure portion 41 and a lid portion 48. Mounting straps 51a and 51b attach via studs 52a and 52b and nuts 53a and 53b, respectively. The straps are wrapped around front bar portion 32 of bottom seat frame 30 shown in FIG. 1. The conventional retractor mechanism is mounted inside a retractor housing 25, which is then mounted inside enclosure portion 41 onto stud 46 and fastened with nut 47. Lid portion 48 is attached to enclosure portion 41 by bolts screwed into openings 49a, 49b, 49c, 49d, 49e, and 49f in enclosure portion 41 and corresponding openings 49aa, 49bb, 49cc, 49dd, 49ee and 49ff in lid 48. Housing unit 40 is attached to rear bar portion 55 (see FIG. 1) by bolt 56 and nut 57. Back cover portion 59 slideably attaches to and mounts on the top portion 45 of enclosure portion 41 and is secured by screws 42a or other suitable means to wooden rail 42 located near the bottom of back seat frame 20. Alternative fastening means are also contemplated in addition to those described herein.

FIG. 2A is a reduced side view of the assembled retractor and belt housing unit 40 showing the aperture 58 through which the retractor belt 60 extends and retracts from the enclosure portion 41, lid portion 48 and back cover portion 59.

Figure 3:
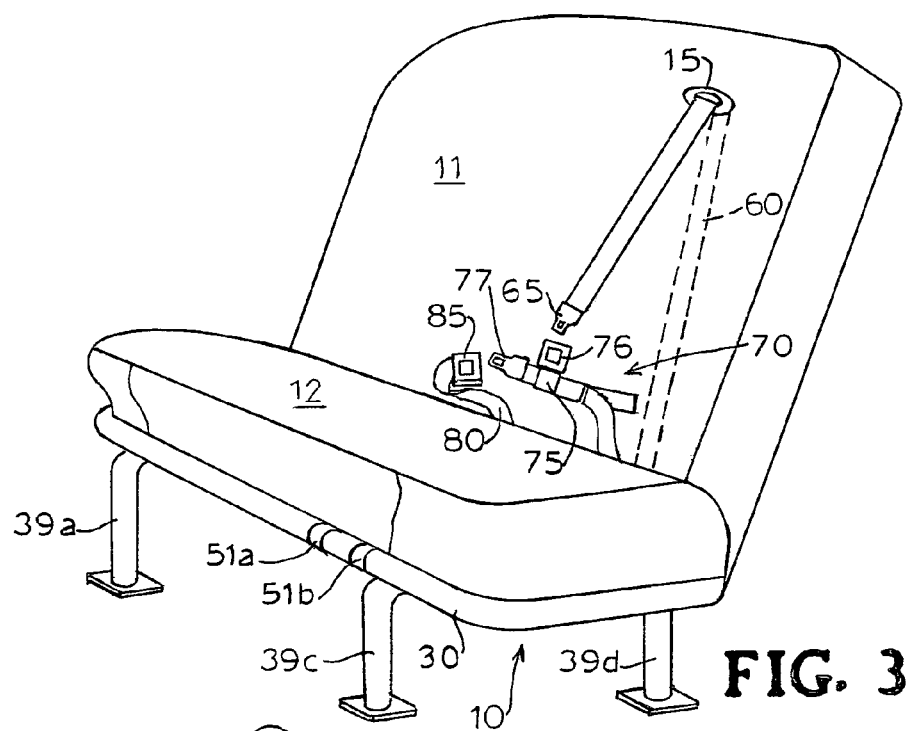
FIG. 3 is a pictorial view of the first embodiment of FIG. 1 with the seat and back cushions and deployment of seat belts.

FIG. 3 shows a pictorial view of the first embodiment of the invention. Seat belt ready seat frame 10 has seat back cushion 11 removably attached to back seat frame 20 (FIG. 1) and seat bottom cushion 12 removably attached to bottom seat frame 30. Seat frame 10 is mounted to the floor of the vehicle by mounting legs 39a, 39b, 39c, and 39d (FIG. 1). Retractor and belt housing unit 40 (FIG. 1) is mounted to frame 10 by mounting straps 51a and 51b. Retractor belt 60 extends from housing unit 40 up the back and over the top of back seat frame 20 or through a channel 15 in seat back cushion 11. Alternative embodiments include routing the retractor belt 60 over the top of the seat back cushion or utilizing molded cushions that permit routing of the webbing through the cushion. Retractor belt 60 has at its distal end a tongue connector 65. Multi-connecting lap and shoulder belt 70 is connected to the seat frame and at its distal end has a Y-junction 75 with a buckle connector 76, which releasably attaches to tongue connector 65. Y-junction 75 also has a tongue connector 77. Single lap belt 80 is connected to rear bar portion 55 and at its distal end to buckle connector 85, which releasably attaches to tongue connector 77. Multi-connecting lap and shoulder belt 70 has the ability to adjust its length to fit various size occupants. Alternative embodiments would permit adjustment of the length of the single lap belt 80, rather than by adjusting the length of belt 70.

Figure 4:
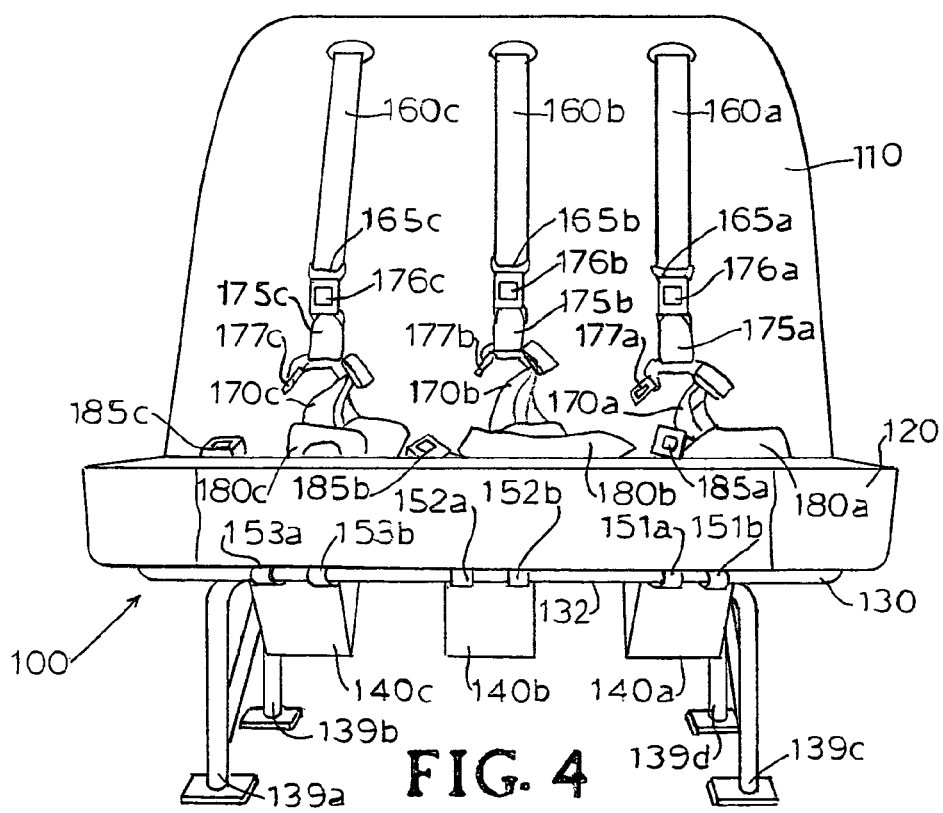
FIG. 4 is a pictorial view of the second embodiment with three retractor and belt housing units, three multi-connecting lap and shoulder belts, and three single lap belts for three occupants.

FIG. 4 shows a pictorial view of a second embodiment of the invention. In this embodiment multiple seat belt systems are employed on a single seat belt ready seat frame 100 with a seat back cushion 110, seat bottom cushion 120 and bottom seat frame 130.

Seat frame 100 is mounted to the vehicle by mounting legs 139a, 139b, 139c, and 139d. Three retractor and belt housing units 140a, 140b and 140c are mounted to the front bar portion 132 by two mounting straps each 151a, 151b, 152a, 152b, 153a, and 153b respectively. Retractor belts 160a, 160b and 160c are extended and retracted from housing units 140a, 140b and 140c respectively and contain tongue connectors 165a, 165b, and 165c respectively. Multi-connecting lap and shoulder belts 170a, 170b and 170c contain Y-junctions 175a, 175b, and 175c respectively. Y-junction 175a contains both buckle 176a, which releasably attaches to tongue connector 165a, and tongue connector 177a. Y-junction 175b contains both buckle 176b, which releasably attaches to tongue connector 165b, and tongue connector 177b. Y-junction 175c contains both buckle 176c, which releasably attaches to tongue connector 165c and tongue connector 177c. Single lap belt 180a, 180a, and 180c, all of which attach to rear bar portion 55, contain at their distal end buckle connectors 185a, 185b, and 185c respectively. Buckle connectors 185a, 185b, and 185c releasably attach to tongue connectors 177a, 177b, and 177c respectively.

FIG. 5 shows a pictorial view of a third embodiment of the invention. Seat belt ready seat frame 10 has seat back cushion 11 removably attached to back seat frame 20 and seat bottom cushion 12 removably attached to bottom seat frame 30. Seat frame 10 is mounted to the floor of the vehicle by mounting legs 39a, 39b, 39c and 39d. Retractor and belt housing unit 40 is mounted to frame 10 by mounting straps 51a and 51b. Retractor belt 60 extends from housing unit 40 up the back and around the top of back seat frame 20 and through a channel 15 in seat back cushion 11. Alternative embodiments include routing the retractor belt 60 over the top of the seat back cushion or utilizing molded cushions that permit routing of the retractor belt through the cushion. Retractor belt 60 connects at its distal end to clasp connector 66. Multi-connecting lap and shoulder belt 270 is connected to the seat frame and at its distal end has a tongue connector 265 with a male post connector 275 located at its front side. Clasp connector 66 releasably attaches to male post connector 275. Single lap belt 80 is connected to rear bar portion 55 and at its distal end to buckle connector 85, which releasably attaches to tongue connector 265. Multi-connecting lap and shoulder belt 270 has the ability to adjust its length to fit various size occupants. Alternative embodiments would permit adjustment of the length of the single lap belt 80, rather than by adjusting the length on belt 270.

Figure 6:
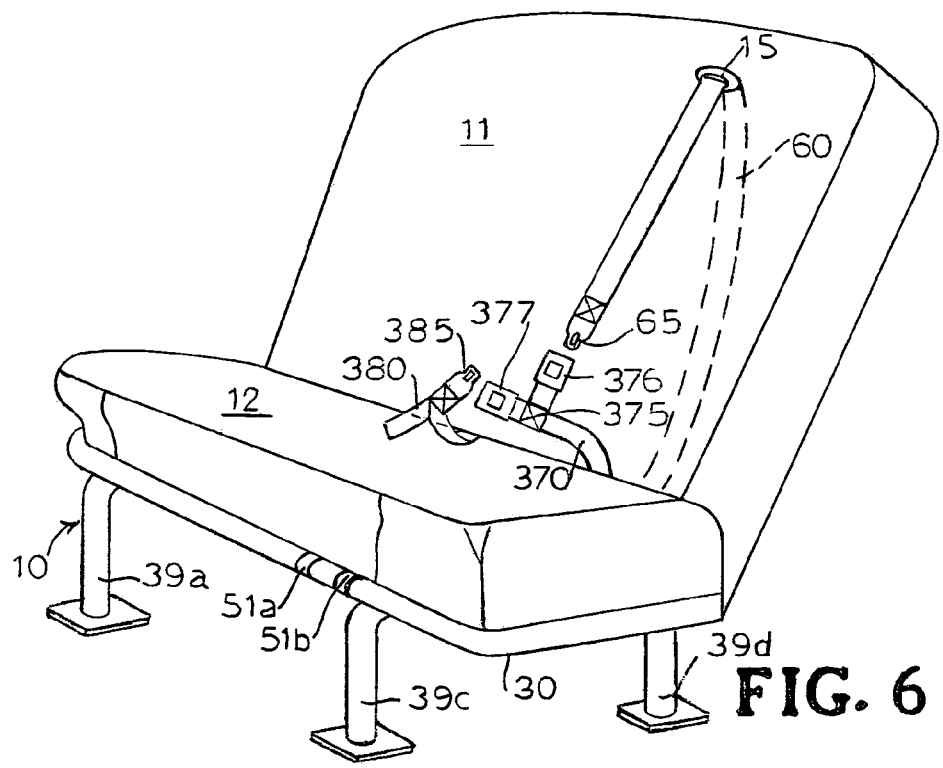
FIG. 6 is a pictorial view of the fourth embodiment illustrating use of a multi connecting lap and shoulder belt with a two-buckle arrangement.

FIG. 6 shows a pictorial view of a fourth embodiment of the invention. Seat belt ready seat frame 10 has seat back cushion 11 removably attached to back seat frame 20 and seat bottom cushion 12 removably attached to bottom seat frame 30. Seat frame 10 is mounted to the floor of the vehicle by mounting legs 39a, 39b, 39c and 39d. Retractor and belt housing unit 40 is mounted to frame 10 by mounting straps 51a and 51b. Retractor belt 60 extends from housing unit 40 up the back and around the top of back seat frame 20 and through a channel 15 in seat back cushion 11. Alternative embodiments include routing the retractor belt 60 over the top of the seat back cushion or utilizing molded cushions that permit routing of the webbing through the cushion. Retractor belt 60 has at its distal end tongue connector 65. Multi-connecting lap and shoulder belt 370 is connected to the seat frame and at its distal end has a Y-junction 375 with a buckle connector 376, which releasably attaches to tongue connector 65. Y-junction 375 also has a second buckle connector 377. Single lap belt 380 is connected to rear bar portion 55 and at its distal end to tongue connector 385, which releasably attaches to buckle 377. Single lap belt 380 has the ability to adjust its length to fit various size occupants. Alternative embodiments would include having the adjustment of the length of the multi-connecting lap belt 370 rather than by adjusting the length on belt 380.

I claim:

1. A three-point seat belt system adapted for use with a seat frame having a seat back with a front and back side and a seat bottom with a topside and an underside, wherein said system comprises:

a) a retractor shoulder belt with a single first connector consisting of a clasp connector on its distal end and adapted to be fixedly attached at its opposite end to the underside of said seat bottom and extending to the front side of said seat back;

b) a multi-connecting lap and shoulder belt adapted to be connected to said seat frame having at its distal end a third connector, having a front and back side, consisting of a tongue connector and a second connector consisting of a post connector attached to the front side of said third connector, which releasably attaches to said first connector; and c) a single lap belt with a fourth connector consisting of a buckle on its distal end, which releasably attaches to said third connector.

* * * * *